Patented July 14, 1936

2,047,226

UNITED STATES PATENT OFFICE 2,047,226

CHEMICAL PROCESS AND CHEMICAL COMPOUNDS DERIVED THEREFROM

George W. Rigby, Wilmington, Del., assignor to E. I. du Pont de Nemours & Company, Wilmington, Del., a corporation of Delaware No Drawing. Application March 15, 1935, Serial No. 11,275

16 Claims. (Cl. 154—2)

This invention relates to new articles of manufacture, more particularly it relates to articles of manufacture wherein an intermediate cementing layer is employed, still more particularly it relates to articles containing a cementing layer comprising deacetylated chitin or a derivative thereof, more specifically it relates to the use of substantially undegraded, at least partially deacetylated chitin as an intermediate cementing layer.

This invention has as an object the provision of new articles of manufacture. A further object is the provision of a process for cementing objects to one another. A still further object is the preparation of laminated products. Other objects will appear hereinafter.

These objects are accomplished by the following invention wherein layers of non-conducting material are cemented together with the use of an intermediate layer of substantially undegraded, at least partially deacetylated chitin or a derivative thereof. Various methods of making this material are disclosed in copending application Serial No. 731,600, filed June 21, 1934.

As an exemplification of the process of preparing a substantially undegraded partially deacetylated chitin the following is cited:

Chitin, from shrimp shells, purified from adherent protein materials and lime salts by successive treatments with boiling 1% soda ash solution, 5% hydrochloric acid solution, and 1% soda ash 0.02% soap solution is treated with 40% sodium hydroxide at 110° C. for about four hours, under conditions which substantially exclude oxidation, then washed with water until neutral to phenolphthalein. The pure white, deacetylated chitin, after drying at 65° C., is dissolved in an aqueous solution of acetic acid in the proportion of 161 grams of deacetylated chitin to 48 grams of acetic acid.

In place of the acetate of the deacetylated chitin above disclosed, other salts may be prepared as disclosed in the above identified application. These include aliphatic acid salts such as the acetate, maleate, tartrate, etc.; aromatic acid salts such as the benzoate, phthalate, sulfonsalicylate, etc.; alicyclic acid salts such as naphthenates; inorganic salts such as the hydrochloride, etc.

The viscosity of solutions of deacetylated chitin may be varied. Thus, by the use of oxidizing agents acting on solid deacetylated chitin, a product which gives lower viscosity solutions is obtained. These oxidizing agents include hydrogen peroxide, sodium peroxide, barium peroxide, sodium perborates, sodium hypochlorite, calcium hypochlorite, potassium permanganate, sodium persulfate, etc. The oxidation may be carried out in alkaline or neutral solution. By heating dry partially deacetylated chitin, for example for 12 hours at 100° C., the solution viscosity may be changed, for example from 5 poises to 200–300 poises in 5% aqueous solution as the acetate.

The deacetylated chitin prepared by the alkaline treatment contains from at least 0.2 to about 0.9 free amino group per chitosamine residue. In other words it has from 0.2 to 0.9 of its nitrogen in the form of free amino groups. The use of products containing from .7 to .86 free amino groups per chitosamine unit of the molecule is preferred.

Solutions of deacetylated chitin salts of maximum solids content ranging from 3% to 20% or more depending largely upon the variety of deacetylated chitin used may be obtained according to the processes of the above-identified copending application. When used as a cement for non-conducting, i. e., electrically non-conducting surfaces, such solutions have been found to be general in application and to develop decided strength and water resistance when thoroughly dried, heated or properly chemically treated. When such solutions are evaporated or allowed to evaporate to dryness, the resulting complex compound containing the deacetylated chitin nucleus is bonded tightly in the form of a tough coherent film to the base material to which the solution may have been applied, providing this base material is a non-metal, i. e., non-conductor. Some of the salts of deacetylated chitin are not readily redissolved by water, and in general they are rendered definitely insoluble in water by suitable drying or heating, by exposure to ammonia, by treatment with alkaline solutions, with compounds containing active carbonyl groups such as formaldehyde, with organic bases or with other chemicals known to be reactive with the amino group. Although most films, even when not dissolved, are more or less swollen by water, the amount of swelling is reduced by heating, formaldehyde treatment, and the other treatments outlined above. When used as glue would be used, deacetylated chitin and its derivatives of the type described in the present application, possess good tensile strength and superior water resistance and particularly so when insolubilized by the methods just described. For best results, especially with non-pervious surfaces, a roughening thereof as by sandpapering is often desirable.

Because of these properties, solutions of salts of deacetylated chitin in water, alone or modified by the addition of other materials, are valuable as adhesives for binding various materials together for the formation of useful articles of manufacture. When used as adhesives, the various salts of deacetylated chitin give essentially similar results under normal conditions. With the more volatile acids, sufficient acid is often lost on thorough drying that separation of the cemented parts does not occur on immersion of the cemented object in water. With less volatile acids, heating may or may not be necessary to cause changes in the deacetylated chitin derivatives which will render them decidedly water insoluble and resistant.

In any case one or more of several reactions may occur. If the acid is volatile it may be lost, leaving a water-insoluble deacetylated chitin. Heat tends to dehydrate the amine salts to give an amide, thus

which is insoluble in water or in acid. The probability of the occurrence of such reactions on heating salts of deacetylated chitin is shown by the fact that they become insoluble in both water and acid. With some dibasic acids an imide may be formed which is also water and acid insoluble. The reactions on heating are illustrative but not limitative.

Having outlined the general principles of the invention, the following examples thereof are included to indicate the broad range of application of deacetylated chitin and its derivatives as adhesives, to demonstrate their advantages, and to indicate that not only may a variety of base materials be employed but also that a considerable number of derivatives of deacetylated chitin may be used to make up in whole or in part the adhesive bond:

In contrast with commonly used adhesives, the acetate of deacetylated chitin develops very considerable water resistance on drying for a considerable period of time, as is illustrated by the following examples:

*Example 1*

Sheets of paper were cemented together using as adhesives a well known liquid glue, a representative office paste and a 10% solution of low viscosity deacetylated chitin as the acetate. These were allowed to dry for 16 hours. While all the sheets stuck firmly together when dry, immersion in water caused the cemented and pasted sheets to separate at once, while the sheets cemented with deacetylated chitin separated only after several hours of continual soaking.

Salts of deacetylated chitin are converted into water insoluble deacetylated chitin by removal or neutralization of the acid, or to water insoluble compounds by heating or treating with chemical reagents which will react with the amine group, such as the aldehydes, anhydrides, acid halides and others as above disclosed. The following example indicates the good water resistance obtained with deacetylated chitin adhesives by thorough drying and highly superior water resistance obtained by chemical modification:

*Example 2*

Small sheets of paper were brushed with 3% medium viscosity deacetylated chitin acetate solution and stuck firmly together. Some were dried for 1.5 hours at room temperature, some at 100° C. for an hour, and still others exposed to ammonia gas and dried for 1.5 hours at room temperature. Similar sheets were cemented with commercial liquid glue, office paste, and with a 10% deacetylated chitin acetate solution and dried for 16 hours. Examined dry all the samples were stuck together but when immersed in cold water the glued and pasted sheets and sheets cemented with deacetylated chitin acetate and dried for ninety minutes separated. Sheets cemented with deacetylated chitin acetate and dried sixteen hours separated only after several hours of continuous soaking. Those thus cemented and then ammonia treated or heated did not separate even after several days soaking in either hot or cold water.

Although the acetate of deacetylated chitin has certain advantages of relatively low cost, ready availability and volatility of the acid component, and therefore has been used more extensively, other salts also possess good adhesive power and develop good water resistance on drying as is illustrated in the following example:

*Example 3*

Laminated paper was prepared by coating single sheets of paper with a 3% solution of high viscosity deacetylated chitin in formic acid and pressing firmly together. After drying thoroughly, seven days soaking in water at room temperature did not loosen the bond while similarly prepared sheets made using glue were separated almost immediately.

A further illustration of the use of salts other than the acetate as well as one in which the insolubilizing agent is incorporated in the adhesive solution is contained in the following illustration:

*Example 4*

To 80 parts of a solution of deacetylated chitin in formic acid containing 1.6 parts of deacetylated chitin was added 0.7 part of formaldehyde. Sheets of paper were laminated with this material as the adhesive and with a similar adhesive containing no formaldehyde. While the control sheets were only separated after 5–6 hours immersion in hot water, the formaldehyde-containing adhesive was still bonded together.

The adhesive properties of deacetylated chitin salts may generally be improved by the addition of wetting agents which will improve the wetting of the base material such as paper, wood, and the like, by the solution. Thus, "hymolal salts"—alkali salts of high molecular weight alkyl bisulfates such as sodium dodecylsulfate—in small quantities definitely improve the wetting of paper and wood by solutions of salts of deacetylated chitin, as illustrated by the following example:

*Example 5*

Five parts of deacetylated chitin were dissolved in 95 parts of a solution consisting of water, 93.5 parts acetic acid 1.5 parts, and hymolal salts powder 0.05 part. When brushed on paper or wood, a much more uniform coat could be applied, and therefore better adhesion obtained than in the case of the cementing without the wetting agent.

While deacetylated chitin is dissolved by most aqueous acids to form viscous solutions, useful concentrations usually contain not over 10% of deacetylated chitin by weight. It is therefore often desirable to give the object to be cemented a preliminary priming coat, as is illustrated in the following example:

Example 6

Wood test blocks of soft pine were painted twice with a 3% solution of high viscosity deacetylated chitin in dilute aqueous maleic acid, heating at 90° C. after each coat. A third coat was then applied and the blocks clamped together until dry. One set was heated 48 hours at 90° C., the other set left at room temperature. After aging 5 days, the blocks were tested for strength in the Riehle Brothers A. S. T. M. cement tester, equipped with special jaws for ply wood joint testing. In each case, the wood broke away instead of the deacetylated chitin. Similar blocks cemented with a high grade, commercial, liquid glue were broken in the glue joint at about ⅗ the weight required for the deacetylated chitin joints.

An outstanding property of the salts of deacetylated chitin when used as adhesives is their development of resistance to water on drying, as illustrated by the following example:

Example 7

Pine blocks were given prime coats of 3% solutions of high viscosity deacetylated chitin in acetic and in maleic acids, the one prime coat being thoroughly dried before applying the next. Two coats were applied and the blocks cemented together with a third. The samples were dried 5 days at room temperatures. Tensile strength tests were made on a Riehle Brothers cement tester, equipped with special jaws for ply wood joint testing, both on the dry blocks and after soaking them in water.

Blocks cemented with the acetate of deacetylated chitin when tested dry and also when tested after five hours soaking broke by complete or partial failure of the wood and without failure of the joint. Similar results were obtained with joints cemented with the maleate. Blocks cemented with a commercial liquid glue when tested dry broke at the joint without failure of the wood, and after soaking five hours separated with no load.

The strength of dry deacetylated chitin adhesive joints or of similar joints soaked in water for 5 hours is thus seen to be greater than the strength of the white pine wood used for these tests.

The adhesive properties of salts of deacetylated chitin are general for non-conducting materials. The adhesive properties are poor for conducting, i. e., metallic surfaces. Because of the low concentration of deacetylated chitin in solutions thereof, prime coats must often be applied, but when properly prepared, good joints can be prepared from many types of materials. Thus, satisfactory joints wherein the deacetylated chitin joint is either deacetylated chitin per se or a derivative thereof may be made of: paper joined to regenerated cellulose, paper, wood, cloth, leather, glass, etc.; wood joined to wood, cork, leather, glass, regenerated cellulose, rubber, cloth, such as viscose rayon, canvas, glass, etc.; leather joined to leather, cork, regenerated cellulose, etc.; cork joined to cork, cloth, such as rayon and canvas; viscose rayon joined to rubber or cloth; regenerated cellulose films joined to cloth or another cellulose film, etc.

While, because of the difficulties of drying or otherwise insolubilizing the deacetylated chitin, deacetylated chitin adhesives are most useful in making joints between articles, at least one of which is pervious to moisture, joints may be made even between two layers impervious to moisture, for example glass, provided care is taken to permit through drying as in an oven.

Products may be made comprising not only deacetylated chitin derivatives but also other adhesives, as shown by the following example:

Example 8

Sheets of paper were first primed with a 1% solution of deacetylated chitin acetate and after drying cemented together with a sodium silicate solution. Adequate joint strength was obtained and, on immersion in water the paper was not stained by the silicate.

It may here be noted that paper, wood, cloth, etc. may be prime-coated with deacetylated chitin, in single or multiple coats, insolubilized by heating or, preferably after drying, by treatment with insolubilizing agents such as ammonia, formaldehyde, acetic anhydride, sulfates, etc. These prime coats may be clear or pigmented and serve as excellent bases for further coatings of lacquer, paint, enamel, or the like.

Deacetylated chitin adhesives may be generally employed in cementing electrically non-conducting surfaces. They are particularly effective in cementing surfaces of water pervious materials in general. They are therefore useful in many applications where ordinary glue may be employed, but as indicated in the examples given above, they are in many ways superior to the ordinary glues. Thus, they may be used in the manufacture of ply wood, as a furniture glue, in the manufacture of laminated paper, in the manufacture of wood veneer paper, in the preparation of safety glass, and the like. The low maximum solids content of its solutions generally render advantageous the use of a priming coat.

The above description indicates the use of these adhesives with paper, cloth, wood, leather, glass, cork, rubber, and the like, but porcelain, plaster, cement, lacquered or painted surfaces, asbestos-cement board, asbestos, mica, and the like, may also be used.

Deacetylated chitin may be made in many different grades or viscosities. The viscosities are most readily characterized by the bubble tube viscosities of the 5% solutions in 1.5% acetic acid. High viscosity materials, i. e., materials having viscosities of several hundred or even thousands of poises give films of greater tensile strength. The lower viscosity solutions permit higher concentration of solids in the solutions to be used for cementing. For keeping solutions of deacetylated chitin it is desirable that a small amount of a mold inhibitor such as thymol, phenol, hexylresorcinol, or the like be employed.

The conditions necessary for improved water resistance vary with the different soluble deacetylated chitin salts. In some cases thorough drying at room temperature is sufficient, in other cases heating or treatment with ammonia or other chemicals such as formaldehyde is highly desirable. The addition of a small amount of formaldehyde to a deacetylated chitin salt solution increases the water resistance of the resulting joint, but also increases the viscosity of the solution.

Organic acid soluble deacetylated chitin may also be combined with other adhesives particularly acid stable adhesives such as glue, library paste, etc. The combination with library paste is particularly effective in increasing water resistance. Slurries of deacetylated chitin and sodium silicate solutions form a more water resistant joint than is obtained with the silicate alone.

While the invention has been described in detail in terms of deacetylated chitin from shrimp shells, the process is generally applicable to deacetylated chitin which is insoluble in water or alkaline media but soluble in aqueous organic acid media and depositing coherent films therefrom, i. e., organic acid-soluble deacetylated chitin. Instead of shrimp shell chitin there may be used chitin or chitin-like material from crab or lobster shells or from the outer integuments of insects such as locusts or grasshoppers or mycelium from fungi such as *Aspergillus niger*.

Cementing layers of substantially undegraded at least partially deacetylated chitin develop good strength and water resistance on drying, heating, ammonia treatment, formaldehyde treatment, acid anhydride treatment, or other insolubilizing treatment in general.

The term "deacetylated chitin" as used in the claims is to be taken to mean chitin which has been treated to remove acetyl groups to such an extent that the material is soluble in acetic acid to a viscous solution which deposits a film on evaporation or coagulation.

The term "substantially undegraded" is used as it is used in cellulose chemistry in general, i. e., to indicate a material which in solution has high viscosity and which may be caused to deposit from such solution in the form of a coherent film.

The above description and examples are intended to be illustrative only. Any modification of or variation therefrom which conforms to the spirit of the invention is intended to be included within the scope of the claims.

I claim:

1. Process of cementing objects, which comprises applying a coating of a 3% aqueous solution of a medium viscosity acetate of deacetylated chitin to one surface each of two sheets of paper, joining said sheets by their coated surfaces, insolubilizing the deacetylated chitin by exposure to ammonia gas, and drying the assembly.

2. Process of cementing objects, which comprises applying a coating of an aqueous solution comprising an acetate of deacetylated chitin to one surface each of two sheets of paper, joining said sheets by their coated surfaces, and drying the assembly.

3. Process of cementing objects, which comprises applying a coating of an aqueous solution comprising a salt of deacetylated chitin to one surface each of two sheets of paper, joining said sheets by their coated surfaces, and drying the assembly.

4. Process of cementing objects, which comprises joining two layers of pervious cellulosic materials by means of a solution comprising an acetate of deacetylated chitin, and drying the assembly.

5. Process of cementing objects, which comprises joining two layers of pervious cellulosic materials by means of a solution comprising a salt of deacetylated chitin, and drying the assembly.

6. Process of cementing objects, which comprises joining at least two layers of glass by means of at least one interposed coating of a solution of an acetate of deacetylated chitin, and drying the assembly.

7. Process of cementing objects, which comprises joining at least two layers of glass by means of at least one interposed coating of a solution of a salt of deacetylated chitin, and drying the assembly.

8. In the process of cementing surfaces of electrically non-conducting material, the step which comprises interposing between said surfaces a layer of a solution of a salt of deacetylated chitin, and drying the assembly.

9. An article of manufacture, which comprises at least two paper layers and at least one intermediate cementing layer comprising deacetylated chitin.

10. An article of manufacture, which comprises a sheet of paper cemented to a non-conducting base material thru an intermediate layer comprising deacetylated chitin.

11. An article of manufacture, which comprises at least two wood layers and at least one intermediate cementing layer comprising deacetylated chitin.

12. An article of manufacture, which comprises a layer of wood cemented to a water pervious base material thru an intermediate layer comprising deacetylated chitin.

13. An article of manufacture, which comprises a layer of fibrous cellulosic material joined to a water pervious base material thru an intermediate layer comprising deacetylated chitin.

14. An article of manufacture, which comprises at least two glass layers and at least one intermediate cementing layer comprising deacetylated chitin.

15. An article of manufacture, which comprises at least two layers of water pervious materials cemented together by a layer of deacetylated chitin.

16. An article of manufacture, which comprises at least two layers of electrically non-conducting materials and an intermediate layer of deacetylated chitin, the adhesion between the non-conducting materials being obtained by cementing with a solution of a salt of deacetylated chitin.

GEORGE W. RIGBY.